(No Model.)
C. H. BRIGGS.
LINE REEL BRAKE.
No. 329,711. Patented Nov. 3, 1885.
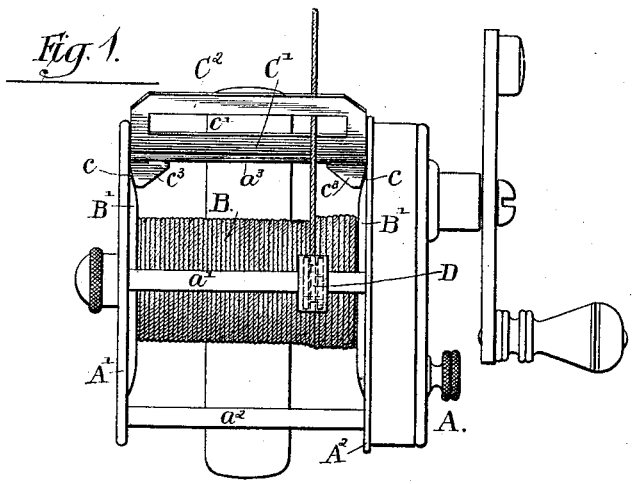
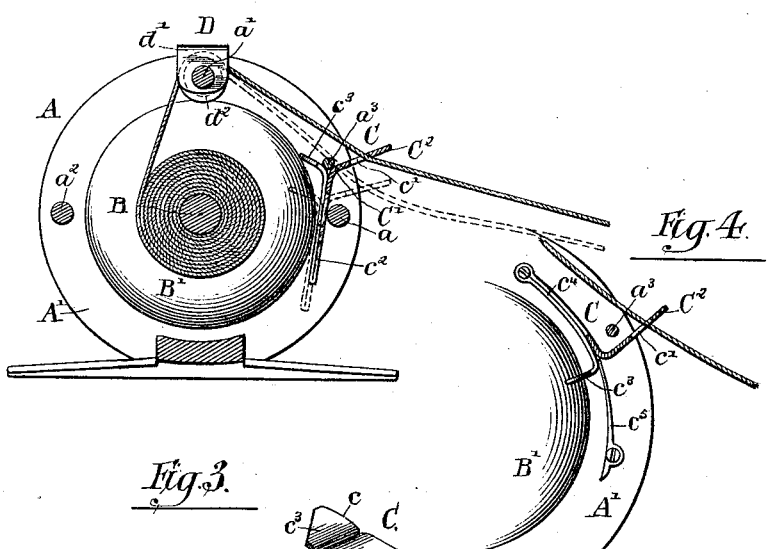
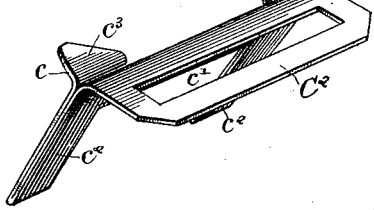
Witnesses:
Louis M. Whitehead.
Gideon F. Lanaghen.
Inventor:
Charles H. Briggs.
by
M. L. Dayton
Attorney.

UNITED STATES PATENT OFFICE.

CHARLES H. BRIGGS, OF CHICAGO, ILLINOIS.

LINE-REEL BRAKE.

SPECIFICATION forming part of Letters Patent No. 329,711, dated November 3, 1885.

Application filed September 17, 1885. Serial No. 177,313. (No model.)

*To all whom it may concern:*

Be it known that I, CHARLES H. BRIGGS, of Chicago, in the county of Cook and State of Illinois, have invented certain new and useful Improvements in Line-Reel Brakes; and I do hereby declare that the following is a full, clear, and exact description thereof, reference being had to the accompanying drawings, and to the letters of reference marked thereon, which form a part of this specification.

This invention relates to an improvement in brake devices for line-reels of fishing-tackle, whereby the rotary movement of the reel may be automatically checked when the line is suddenly slackened after being drawn rapidly from the reel, and the objectionable "over-running" of the reel liable to occur at such times is thereby prevented.

The invention consists in the matters hereinafter described, and pointed out in the appended claims.

A device embodying my invention consists, essentially, of a movable piece of metal forming a brake, which is mounted upon the reel-frame and adapted to be thrown into engagement with the reel-heads, either by gravity or by the action of a spring, said brake being provided with a loop or aperture for engagement with the part of the line leading from the reel, the parts being so arranged that when the line is taut, either when it is being drawn out or reeled in, the brake will be held free from the reel, and when the line is slackened the brake will engage the reel.

The invention may be more readily understood by reference to the accompanying drawings, in which—

Figure 1 is a top view of a line-reel, showing a preferred form of device embodying my invention. Fig. 2 is a sectional view of the same, taken upon line $x\,x$ of Fig. 1. Fig. 3 is a detail perspective view of the part shown in Fig. 1, which composes the brake proper. Fig. 4 is a fragmentary sectional view of the reel, showing another form of device embodying the main features of my invention.

In the said drawings, A is a reel-frame, of familiar form, consisting of the usual end plates, $A'\,A^2$, and cross-bars $a\,a'\,a^2$; and B is a reel made in the usual manner, with end plates or heads, $B'\,B'$, extending slightly inward from the inner faces of the end plates, $A'\,A^2$, of the head, and provided with beveled or rounded surfaces $b\,b$ at their margins.

C indicates the brake, which is mounted movably upon the reel frame, and is provided with a slot or opening, $c'$, to receive the line, and with surfaces $c\,c$, adapted to engage the beveled or rounded parts $b\,b$ of the reel-heads, as will hereinafter be more particularly described.

D is a line-guide over which the line is shown as passing between the brake and the reel, and which consists of a roller, $d$, adapted to rotate and slide freely upon the cross-bar $a'$ and a metal loop, $d'$, for holding the line upon the roller. Said line-guide is shown in a prior patent granted to me upon the 8th day of September, 1885, and is not claimed herein as part of the present invention.

In Figs. 1, 2, and 3 the brake C is shown as consisting of a metal plate held loosely upon the reel-frame by suitable stops or cross-bars thereon, and adapted to engage the reel-heads by gravity; and in Fig. 4 a form of the said brake is shown in which the latter is pivotally supported upon the frame, and is thrown into engagement with the reel by a spring.

In both forms of the device the brake is so located upon the reel-frame that the line is caused to exert an outward pressure upon the brake when it is taut, so that when the line is being drawn out or while being reeled in the brake will be released from the reel, and the latter allowed to revolve freely. When, however, the line is slackened, as by a sudden cessation of the strain upon it while being unreeled, the brake will be caused to engage the reel by gravity in one case and by the action of the spring in the other case, and the rotation of the reel will thereby be promptly stopped.

In the particular form of the device shown in Figs. 1, 2, and 3 the brake C consists of a metal bar or plate, $C'$, arranged parallel with the axis of the reel between the end plates, $A'\,A^2$, of the frame, and provided with an outwardly-projecting part or loop, $C^2$, in which the slot $c'$ for the line is formed. Said plate is provided also at its ends with depending parts or arms $c^2\,c^2$, the outer edges of which are parallel and clearly proximate or touch loosely the inner faces of the end plates, A' A², thereby forming guides to hold the plate at right angles with the said end plates, and preventing its binding thereon in its several movements. The bar C' is also provided with inwardly-directed parts $c^3$ $c^3$, inclined or beveled upon their outer edges, $c\ c$, and projecting between and adapted to bind upon the beveled surfaces $b\ b$ of the reel-heads.

As a simple and cheap construction of this form of brake, the plate C' is preferably made of a single piece of sheet metal, the projections $c^3$ being made in one piece with the arms $c^2$ by cutting the blank with strips to form the arms more than twice as long as the latter, and then folding said strips upon themselves, so as to make the arms double, as shown, the surplus metal at the extremities of the strips being bent downwardly to form the said parts $c^3$ $c^3$. The plate C', formed with the parts $C^2$ $c^2$ $c^2$ and $c^3$ $c^3$, as described, is held in place upon the reel-frame by means of one of the front or outer cross-bars, $a$, thereof, between which and the beveled margins $b\ b$ of the reel-heads the arms $c^2$ $c^2$ are placed, together with an additional bar or rod, $a^3$, extending from one head to the other of the frame a short distance above and parallel with the bar $a$, the part $C^2$ of the plate being located between the said two bars, as clearly shown in Fig. 2. The parts being so arranged, when the brake is drawn outwardly and upwardly by the tightening of the line the projections $c^3$ $c^3$ will be freed from the reel-heads, and will rest in contact with the rod $a^3$, which thus acts as a stop to the outward and upward movement of the brake.

The position of the parts of the brake when lifted is clearly shown in full lines in Fig. 2. When the line is slackened, (the reel being held with the loop $C^2$ uppermost,) the brake will fall by gravity into the position shown in dotted lines in Fig. 2, the projections $c^3$ $c^3$ being forced into contact with the reel-heads by the action of the bar $a$ upon the arms $a^2$ $a^2$ and the outer face of the plate. It will be observed in this connection that when the brake is released the arms $a^2$ $a^2$ will come in contact with the reel-heads, but this will not be of disadvantage, inasmuch as the motion of the reel will tend to carry the brake into engagement with the reel-heads, and thereby make the action of the brake more certain when the reel is not held in a position most favorable for the operation of the brake by gravity.

In the form of the device shown in Fig. 4, the brake is provided with arms $c^4$, pivoted upon the end plates of the frame, and very light springs $c^5$ are applied to the said arms to throw the brake into engagement with the reel. The slot $c'$ for the line is desirably made to extend the full length of the reel, so that the line may be moved back and forth to wind it evenly thereon. The line-guide D is for the purpose of laying the line in even coils upon the reel, as fully set forth in the prior patent above referred to. Said guide is not, however, necessary for the successful operation of the brake described, inasmuch as the line may be arranged to pass directly from the reel to the brake, with the same result as hereinbefore described, though preferably it may pass over the bar $a'$, on which said line-guide is mounted.

I claim as my invention—

1. The combination, with a line-reel, of a brake for the reel engaged with the line, whereby the brake will be automatically released when the line is tightened and applied when the line is slackened, substantially as described.

2. The combination, with a line-reel and frame, of a brake consisting of a movable piece or plate adapted for engagement with the reel-heads and provided with an opening or slot for engagement with the line, and stops upon the frame for holding said plate in place and limiting its movement, substantially as described.

3. The combination, with a line-reel and reel-frame, of a movable brake, C', provided with inwardly-directed projections $c^3$, a slot, $c'$, and arms $c^2$, and stops $a\ a^3$ upon the reel-frame for retaining said plate movably in position, substantially as described.

4. The combination, with a line-reel and reel-frame, of a movable brake, C', provided with a slot, $c'$, and having projecting parts $c\ c$ and $c^2\ c^2$ formed of a single piece of sheet metal bent substantially as described.

In testimony that I claim the foregoing as my invention I affix my signature in presence of two witnesses.

CHARLES H. BRIGGS.

Witnesses:
M. L. DAYTON,
C. CLARENCE POOLE.